3,431,233
NOVEL PIPERIDINE N-OXIDE POLYOLEFIN STABILIZERS
Keisuke Murayama, Syoji Morimura, Saburo Akagi, Tomoyuki Kurumada, and Ichiro Watanabe, Tokyo, and Atsushi Kitaoka, Nobeoka, Japan, assignors to Sankyo Company Limited, Tokyo, Japan, and Asahi Kasei Kogyo Kabushiki Kaisha, Osaka, Japan
No Drawing. Filed Nov. 25, 1966, Ser. No. 596,809
Claims priority, application Japan, Nov. 26, 1965, 40/72,646
U.S. Cl. 260—45.8          6 Claims
Int. Cl. C08f 51/60; C07d 29/12

ABSTRACT OF THE DISCLOSURE

Polyolefins are stabilized against deterioration resulting from exposure to light with piperidine N-oxides.

This invention relates to the stabilization of polyolefin. More particularly, it relates to the stabilization of polyolefin against deterioration resulting from exposure to light with a new class of piperidine compounds.

Polyolefins such as polyethylene, polypropylene and the like are frequently subjected to photo-deterioration when exposed to light such as sunlight or ultraviolet light. For the purpose of stabilizing polyolefins against such deterioration, there have been provided a great number of light stabilizers, especially such light stabilizers as "Tinuvin P" (the stabilizer containing as active ingredient 2-(2'-hydroxy-5'-methyl)-phenylbenzotriazole); and 2,4-dihydroxybenzophenone. However, these prior art stabilizers are not satisfactorily effective in the inhibition of deterioration of the polyolefins, especially when employed under the outdoor exposure to sunlight. Thus, the appearance of the more effective stabilizers is highly desired in the art.

It is, therefore, an object of this invention to provide a new stabilizer for polyolefins against deterioration resulting from exposure to light.

It is another object of this invention to provide polyolefins stabilized against deterioration under the action of light with a new stabilizer.

Other objects will appear in the more detailed description of this invention which follows.

These objects are, in accordance with this invention, accomplished by incorporating into polyolefin a piperidine compound having the formula

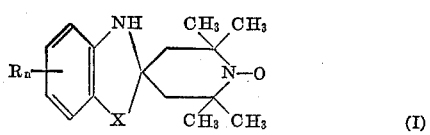

(I)

wherein X represents imino group (>NH), oxygen atom or sulfur atom, R represents alkyl group, benzyl group or phenyl group and n is an integer of 0–2 inclusive.

The term "polyolefin" as used herein is intended to include high and low pressure polyethylenes, polypropylene, other polyolefins, for example, polybutadiene or polyisoprene, and various olefin copolymers, for example, ethylene-propylene copolymers, styrene-butadiene copolymers or acrylonitrile-butadiene-styrene copolymers.

The aforesaid piperidine compounds (I) in this invention are novel compounds unknown in the prior art and they can be readily and advantageously obtained by a procedure which involves reaction of the corresponding 4-piperidone or 2,2,6,6-tetramethyl-4-oxopiperidine-1-oxide with suitable O-phenylenediamine, O-aminophenol or O-aminothiophenol in an organic solvent in the presence of a suitable acid catalyst.

Typical examples of the present novel piperidine compounds (I) are illustratively given hereinbelow:

benzimidazoline - 2 - spiro - 4'-(2',2',6',6'-tetramethyl-piperidine-1'-oxide);
5 - methylbenzoxazoline - 2 - spiro-4'-(2',2',6'6'-tetramethylpiperidine-1'-oxide);
5 - octylbenzoxazoline - 2 - spiro - 4'-(2',2',6',6'-tetramethylpiperidine-1'-oxide);
5 - benzylbenzoxazoline - 2 - spiro - 4'-(2',2',6',6'-tetramethylpiperidine-1'-oxide);
5 - phenylbenzoxazoline - 2 - spiro - 4'-(2',2',6',6'-tetramethylpiperidine-1'-oxide);
benzthiazoline - 2 - spiro - 4' - (2',2',6',6'-tetramethyl-piperidine-1'-oxide); and
5 - methyl - 7 - t.-butyl-benzoxazoline-2-spiro-4'-(2',2',6', 6'-tetramethyl-piperidine-1'-oxide).

Where the present piperidine compounds (I) are employed in polyolefin for the purpose of stabilization, they may be incorporated or blended into polyolefin by any of the conventional methods commonly used for incorporating or blending commercially available stabilizers such as antioxidants into the polyolefin; for instance, by incorporating the present piperidine compound into the polyolefin at any desired stage prior to the preparation of shaped articles.

The amount of the piperidine stabilizer employed in the polyolefin in accordance with this invention can be widely varied, depending upon the properties and particular use of the stabilized polyolefin and other factors, but generally it is preferred to employ the piperidine stabilizer in the range of concentrations of about 0.05–2% by weight, most preferably concentrations of about 0.1–1% by weight, the concentration being based upon the weight of the polyolefin.

Other additives commonly used in the art, including other known antioxidants and ultraviolet absorbants may be optionally utilized together with the present piperidine stabilizers. If necessary, an optional combination of two or more piperidine stabilizers in accordance with this invention may be satisfactorily employed in order to achieve the better results.

The following non-limiting examples are given for the purpose of illustrating the excellent light resistance of the piperidine compounds (I) in the polyolefin in accordance with this invention. All parts are given by weight unless otherwise indicated.

Example 1

With 100 parts of polypropylene was uniformly admixed 0.25 part of the stabilizer indicated hereinbelow.
The mixture was melted by heating and molded into a sheet of 0.5 mm. thick.
The polypropylene sheet thus produced and, as a control, that containing no stabilizer for comparative purposes were tested with ultraviolet irradiation at 45° C. by way of the Fade-Ometer prescribed in the JIS-L-1044-3–8.
The time until the test sheet will become brittle, hereinafter referred to as "brittle time," was measured. The results are listed in the following Table I.

TABLE I

| Stabilizer (the present invention): | Brittle time (hrs.) |
|---|---|
| Benzimidazoline - 2 - spiro - 4' - (2',2',6',6'-tetramethylpiperidine - 1' - oxide) | 280 |
| Benzthiazoline - 2 - spiro - 4' - (2',2',6',6'-tetramethylpiperidine - 1' - oxide) | 240 |

| Stabilizer: | Brittle time (hrs.) |
|---|---|
| Commercially available: | |
| "Tinuvin P" | 80 |
| 2,4 - dihydroxybenzophenone | 100 |
| Control: None | 40 |

From the foregoing results it will be apparent that the present piperidine compounds exhibit superior stabilizing effect with respect to reducing deterioration of the polyolefin, particularly polypropylene, by light, as compared with known light stabilizers.

Example 2

With 100 parts of low pressure polyethylene was uniformly admixed 0.25 part of the stabilizer indicated hereinbelow.

The mixture was melted by heating and molded into a sheet 0.5 mm. thick.

The polyethylene sheet thus produced and, as a control, that containing no stabilizer for comparative purposes were tested by the same method as in Example 1.

The "brittle time" was measured in the same manner as in Example 1.

The results are listed in the following Table II.

TABLE II

| Stabilizer (the present invention): | Brittle time (hrs.) |
|---|---|
| 5 - methylbenzoxazoline - 2 - spiro - 4'-(2',2',6',6'-tetramethylpiperidine - 1' - oxide) | 520 |
| Commercially available: | |
| "Tinuvin P" | 320 |
| 2,6 - di - t - butyl-4-methylphenol | 280 |
| Control: None | 260 |

From the foregoing results it will be apparent that the present piperidine compounds also exhibit superior stabilizing effect with respect to reducing deterioration of the polyolefin, particularly polyethylene, by light, as compared with known light stabilizers.

What is claimed is:

1. Polyolefin stabilized against deterioration by light wherein there is incorporated a sufficient amount to inhibit the deterioration of a compound having the formula

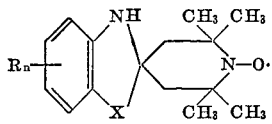

wherein X represents imino group, oxygen atom or sulfur atom, R represents alkyl group, benzyl group or phenyl group and $n$ is an integer of 0–2, inclusive, said polyolefin being a homopolymer of mono-alpha-olefin or a copolymer of mono-alpha-olefin with other ethylenically unsaturated monomers.

2. Polyolefin stabilized against deterioration by light wherein there is incorporated an amount of 0.05–2% by weight of a compound selected from the group consisting of benzimidazoline - 2 - spiro-4'-(2',2',6',6'-tetramethylpiperidine-1'-oxide),
benzthiazoline - 2 - spiro-4'-(2',2',6',6'-tetramethylpiperidine-1'-oxide), and
5-methylbenzoxazoline - 2 - spiro-4'-(2',2',6',6'-tetramethylpiperidine-1'-oxide), said polyolefin being a homopolymer of mono-alpha-olefin or a copolymer of mono-alpha-olefin with other ethylenically unsaturated monomers.

3. Polyethylene stabilized against deterioration by light wherein there is incorporated a sufficient amount to inhibit the deterioration of a compound having the formula

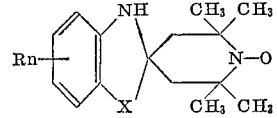

wherein X represents imino group, oxygen atom or sulfur atom, R represents alkyl group, benzyl group or phenyl group and $n$ is an integer 0–2, inclusive.

4. Polyethylene stabilized against deterioration by light wherein there is incorporated an amount of 0.05–2% by weight of a compound selected from the group consisting of benzimidazoline-2-spiro-4'-(2',2',6',6' - tetramethylpiperidine-1'-oxide),
benzthiazoline - 2 - spiro-4'-(2',2',6'-6'-tetramethylpiperidine-1'-oxide), and
5-methylbenzoxazoline - 2 - spiro-4'-(2',2',6',6'-tetramethylpiperidine-1'-oxide).

5. Polypropylene stabilized against deterioration by light wherein there is incorporated a sufficient amount to inhibit the deterioration of a compound having the formula

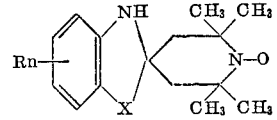

wherein X represents imino group, oxygen atom or sulfur atom, R represents alkyl group, benzyl group or phenyl group and $n$ is an integer of 0–2, inclusive.

6. Polypropylene stabilized against deterioration by light wherein there is incorporated an amount of 0.05–2% by weight of a compound selected from the group consisting of benzimidazoline-2-spiro-4'-(2',2',6',6' - tetramethylpiperidine-1'-oxide),
benzthiazoline - 2 - spiro-4'-(2',2',6',6'-tetramethylpiperidine-1'-oxide), and
5-methylbenzoxazoline - 2 - spiro-4'-(2',2',6',6'-tetramethylpiperdine-1'-oxide).

References Cited

UNITED STATES PATENTS

| 3,334,103 | 8/1967 | Feldman et al. | 260—290 |
| 3,361,707 | 1/1968 | Newland | 260—45.8 XR |

DONALD E. CZAJA, Primary Examiner.

M. J. WELSH, Assistant Examiner.

U.S. Cl. X.R.

260—294.7